Patented Nov. 29, 1949

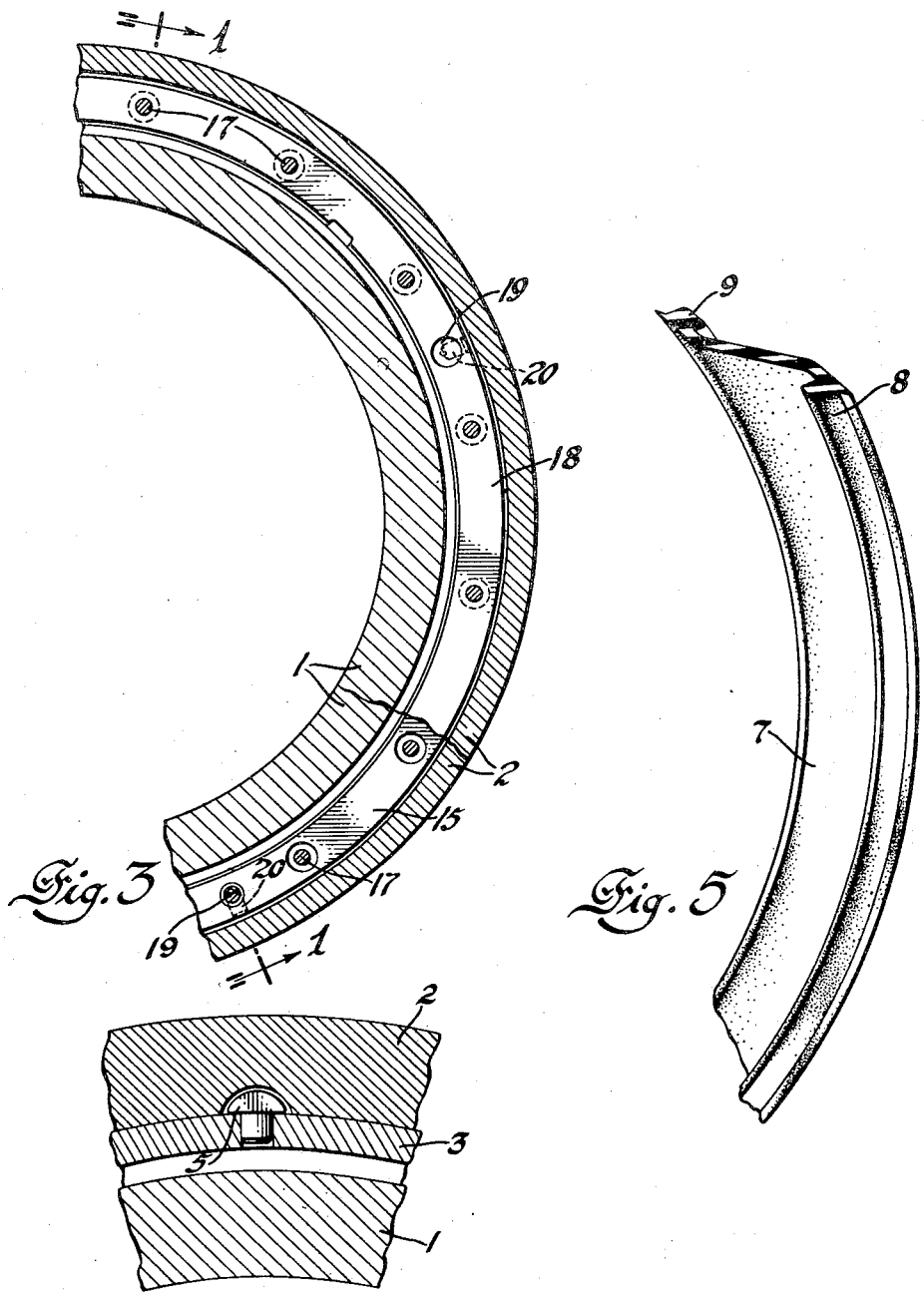

2,489,545

UNITED STATES PATENT OFFICE 2,489,545

SEAL

John E. Storer, Indianapolis, Ind., and Albert J. Timmer, Dayton, Ohio, assignors to General Motors Corporation, Detroit, Mich., a corporation of Delaware Application July 11, 1947, Serial No. 760,306

2 Claims. (Cl. 286—11)

1

This invention relates to an improved running fit seal and has been designed especially for use between counterrotating airplane propeller shafts which extend from a lubricant containing gear box or the like. With dual propellers rotating one immediately behind the other on the same axis but in opposite directions, the axial end thrust of one of the concentrically nested shafts is additive to that of the other shaft. The relative and variable axial thrust, as well as the allowable axial misalignment and angularity, has introduced critical problems in the maintenance of a leakproof seal between the shafts and it is a primary object of this invention to provide an effective and carefree running seal under all conditions of operation and one which will be simple in construction, inexpensive to manufacture and easy to install and service.

Figure 1:
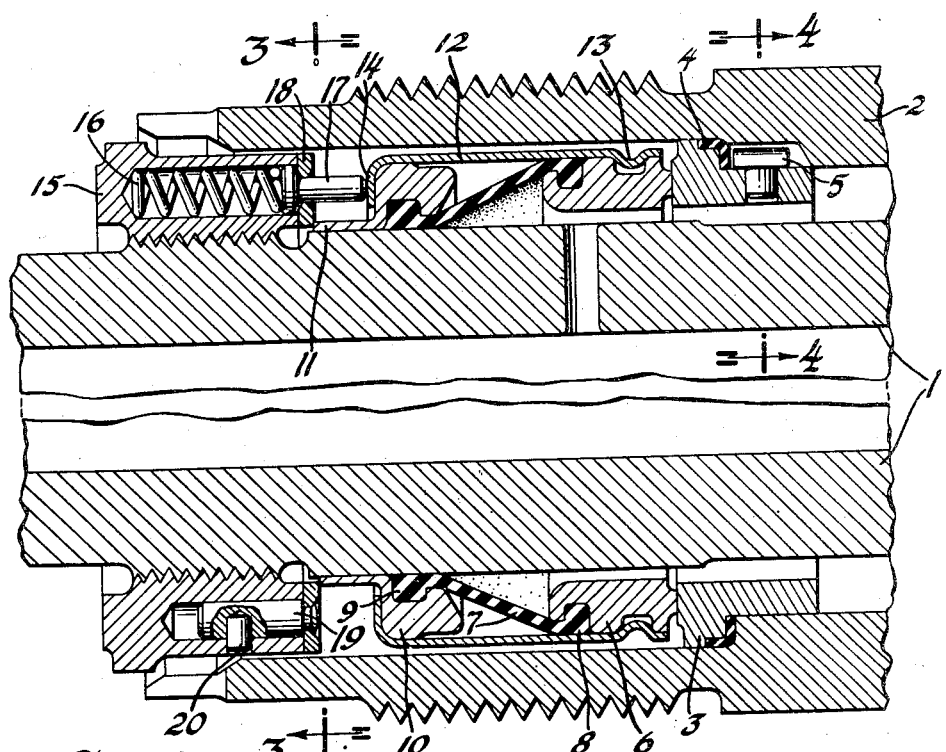
Figure 2:
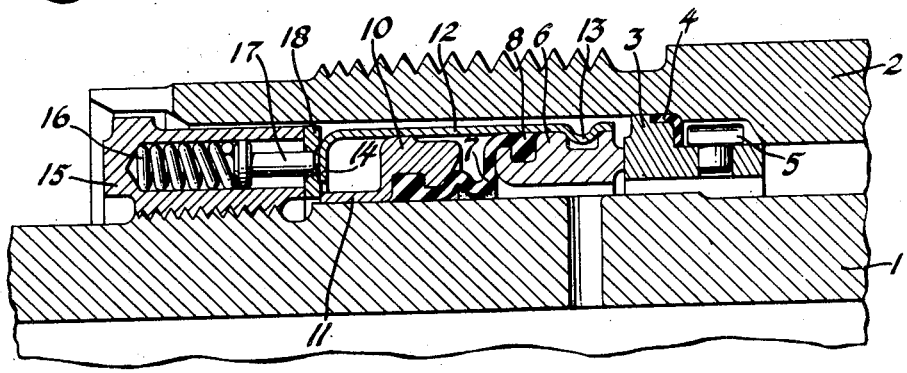

In the accompanying drawing Figure 1 is a detail longitudinal section through the shafts at the location of the seal with the seal parts being shown in one extreme position of relative axial shaft movement, the section being considered as having been taken on line 1—1 of Figure 3; Figure 2 is a view similar to Figure 1 but showing the relation of the seal parts when the shafts are axially displaced to their limit in the opposite direction; Figure 3 is a fragmentary transverse section as on line 3—3 of Figure 1; Figure 4 is a detail section as on line 4—4 of Figure 1 and Figure 5 is a perspective view showing a fragment of a rubber closure sleeve.

The concentrically arranged inner member 1 and outer member 2 shown in the drawing may be considered as counterrotating propeller shafts and as having movement relative to each other both axially and rotatably. At its end the hollow outer shaft 2 has an interior enlarged bore affording a pocket for the removable reception of the sealing members which close off the space between the inner and outer shafts. The accurately formed nitrided ring 3 is fitted to the inner shoulder of the chamber end of the shaft 2 and interposed between the ring and shoulder there is preferably inserted a suitable gasket 4, preferably bonded to ring 3. To fix the ring 3 against rotation relative to the outer shaft 2 a headed keying pin 5 is carried by the skirt portion of the ring 3 and has its head located within an axially extending groove in the outer shaft 2. Cooperating with the sealing surface on the nose of the ring 3 is a complementary sealing face on the end of a brass ring 6 which is rotatably carried by but floats axially in relation to the inner shaft 1. The space between the ring 6 and the shaft

2

1 is closed by an axially extending sleeve 7 secured at opposite ends to the ring 6 and the shaft 1, respectively. This sleeve 7 is molded of rubber. As here used the word "rubber" is intended to include natural and synthetic materials and other like nonmetallic elastic deformable substances. This rubber sleeve as initially formed has enlarged stiffening beads 8 and 9 at opposite ends and the internal diameter at each end is made somewhat smaller than the outside diameter to which theses parts are to be fitted. Thus at the end containing the external bead 9 the rubber sleeve, including the rib 9, is placed under a tensional stress when it is expanded to fit the outside diameter of the shaft 1. It thus hugs tightly or squeezes against the shaft for a tight frictional fit. To assist in holding the beaded end under stress a metal retainer ring 10 has an internal groove in which the bead is seated and a cylindrical axially extending spacer skirt 11 which embraces the shaft 1.

In somewhat like manner the opposite end of the sleeve 7 or that which contains the internal bead 8 has a snap fit into and is located by an annular seating groove in the periphery of the seal ring 6. It is retained under stress and held against dislodgment by a stiff metal sleeve 12 which fits over the ring 6 and is secured thereto by an internal rib 13 pressed therein and into a peripheral annular groove in the ring 6. At its opposite end the sleeve 12 is peripherally guided by sliding engagement with the retainer ring 10 and terminates in an inturned flange 14 just beyond the ring 10. If desired and as a matter of choice the ring 10 and the sleeve 12 may be keyed together in any suitable way for accommodating relative axial movement while resisting relative rotational movement whereby to relieve the rubber sleeve 7 from torsional drive. It will be noted that the rings 6 and 10, together with the sleeves 7 and 12, constitute a unitary subassembly for insertion within the pocket between the shafts.

Closing the pocket is a specially formed nut 15 having screw threaded engagement with the inner shaft 1. From its inner end the nut 15 has drilled therein a series of axially extending and circumferentially spaced openings, certain of which are preferably equally spaced apart to house compression coil springs and headed pins or plungers to act on the sleeve 12 for maintaining the sealing ring 6 in contact with the sealing ring 3 throughout the range of relative axial movement under propeller thrust on the shafts 1 and 2. One of the springs 16 is shown expanded to its limit in Figure 1 and is shown fully compressed in Figure 2. Its headed pin 17, whose end engages with the inturned flange 14 of the sleeve 12, has its enlarged head slidable in the bore of the opening and its reduced diameter pin portion slidably guided in an aperture in a retainer plate 18 covering the several openings and being secured in place at three or more circumferentially spaced positions by means of pins 19 riveted thereto and projected in openings in the nut 15 and retained in said openings by dowel pins such as 20.

It will be noted that the force of the spring 16 is applied oppositely and equally to the two shafts and insures a tight running fit of the seal faces throughout relative axial shaft displacement, with the rubber sleeve accommodating the movement while completing the seal. Furthermore, the flexibility takes care of angular shaft displacement wherein movement may occur between the sleeve 12 and the retainer ring 10 to allow the rings 3 and 6 to maintain alignment at their seal faces.

We claim:

1. In combination, counterrotatable concentric shafts, the outer of which terminates in an internal chamber having an inner shoulder affording an outwardly facing running seal ring, a mounting collar having a skirt of reduced diameter at the outer end thereof press fitted on the inner shaft and having inwardly of said skirt an enlargement formed with an internal channel, an inwardly facing floating seal ring supported against radial displacement by a skirt extension having radial support bearing on said collar enlargement and terminating in an inturned flange telescopically related to said reduced diameter skirt on the mounting collar, a rubber sleeve tension fitted at one end to said floating seal ring and tension fitted at its opposite end to the inner shaft and retained within said channel of the mounting collar and an annular closure at the outer end of the channel including a nut threaded on the inner shaft into locating abutment with said collar skirt, a series of coil springs housed within circumferentially spaced openings in said nut, headed pins slidably located within said openings to transfer spring pressure to said inturned flange and a cover fixed to overlie the inner face of the nut with openings therein through which said pins slidably project.

2. Means housed within and arranged to seal the space between a pair of relatively rotatable members, an outwardly facing seal ring carried by one of the members, two unitary subassemblies carried in cooperative relation by the other member, one of said subassemblies comprising a floating seal ring, a support bearing therefor and an elastic seal sleeve between the ring and its bearing, said bearing being constituted by an annulus having in axial succession a thin locating skirt in close fit relation with said other member and a thicker head portion with a bearing support surface on one axially extending face and with a radial channel in its opposite axially extending annular face, said seal sleeve at one end being received within said radial channel and having a stress fit to said other member and at its opposite end having a stress fit with the floating seal ring and being received within a locating channel therein, said floating seal ring having a supporting skirt in cooperative sleeve end retaining relation to the last mentioned channel and projecting axially outwardly of the ring in telescopic bearing engagement with the support surface of said thicker head portion and terminating outwardly beyond the head portion in a lateral flange for cooperation with the head portion as a keeper and serving as a spring pressure receiving seat, the other subassembly comprising an abutment and retainer ring detachably fixed on said other member at the outer end of said space in locating abutment with the outer end of said locating skirt portion and spring means housed within the abutment ring in force exerting seating contact with the lateral flange to urge the floating ring inwardly.

JOHN E. STORER.
ALBERT J. TIMMER.

REFERENCES CITED

The following references are of record in the file of this patent:

UNITED STATES PATENTS

| Number | Name | Date |
|--------|------|------|
| 853,506 | Eddy | May 14, 1907 |
| 1,634,246 | Jones et al. | June 28, 1927 |
| 2,373,463 | Curtis | Apr. 10, 1945 |
| 2,377,387 | Stromeier | June 5, 1945 |
| Re. 22,666 | Snyder | Aug. 14, 1945 |